Aug. 18, 1953   H. K. MacKENZIE   2,648,913
CIRCUMFERENCE MEASURING INSTRUMENT FOR CYLINDRICAL ARTICLES
Filed Nov. 29, 1949   2 Sheets-Sheet 2
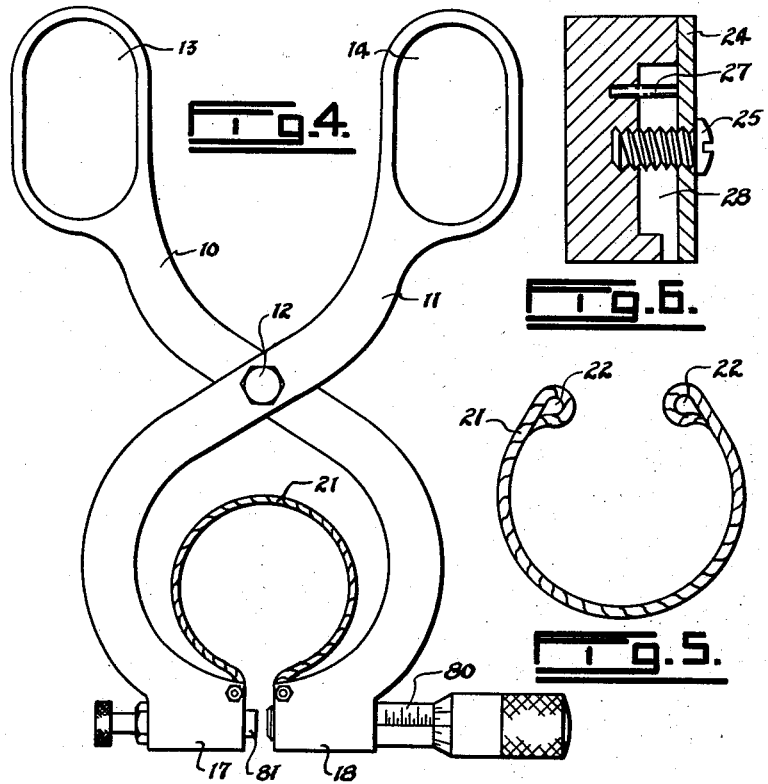
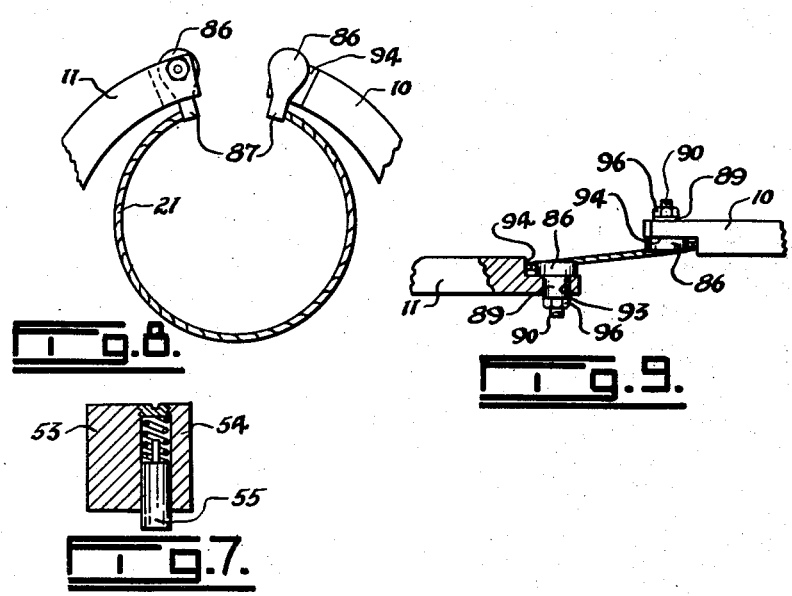
INVENTOR
HARVEY K. MacKENZIE
BY
Fetherstonhaugh & Co.
ATTORNEYS Patented Aug. 18, 1953

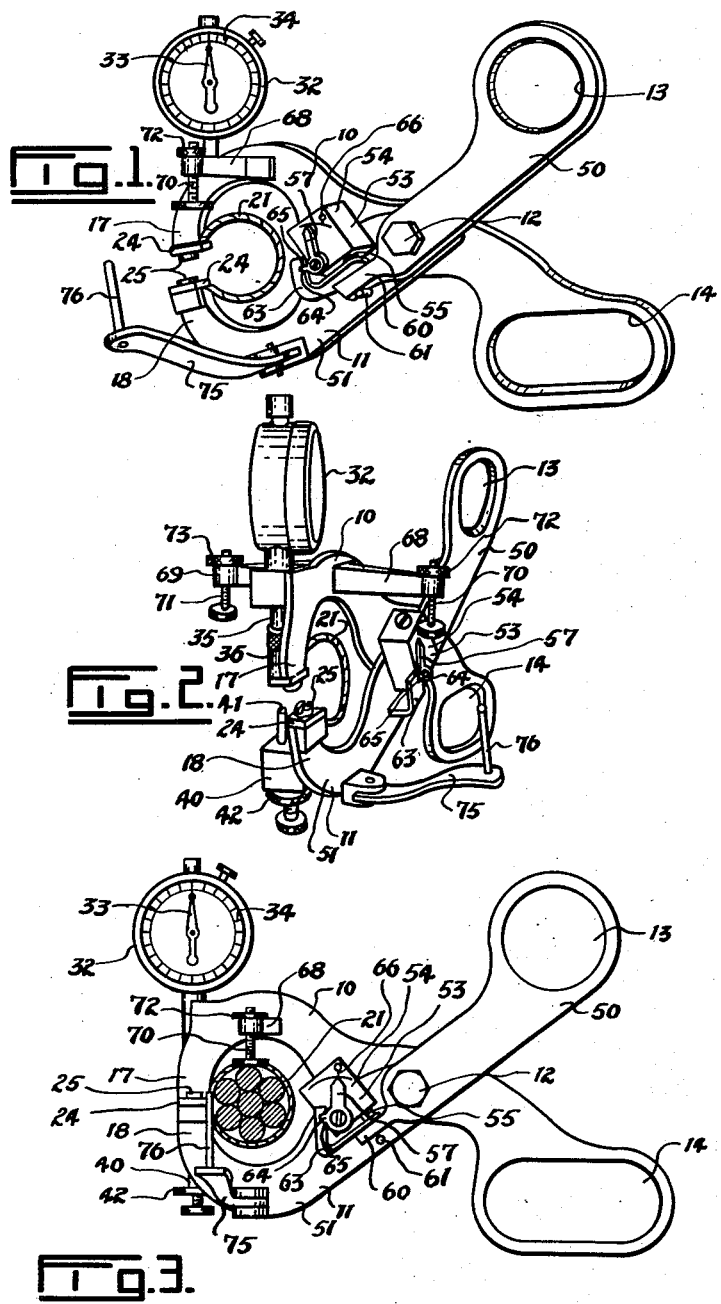

2,648,913

UNITED STATES PATENT OFFICE 2,648,913

CIRCUMFERENCE MEASURING INSTRUMENT FOR CYLINDRICAL ARTICLES

Harvey K. MacKenzie, Pioneer Mines, British Columbia, Canada

Application November 29, 1949, Serial No. 129,960

12 Claims. (Cl. 33—179)

This invention relates to an instrument for measuring cylindrical articles, such as ropes, wire ropes, or cables, rods and the like.

This instrument is primarily designed for inspecting ropes or cables which are under constant strain for wear or deterioration, although it may be used for other purposes. For example, this instrument may be used for testing elevator cables. For the sake of safety, cables of this nature have to be inspected and tested regularly and when any part of them drops below a certain size in diameter or circumference, they must be replaced.

At present, cables or ropes of this nature are not inspected as often and as carefully as they should be because it is a long and laborious job. When testing these cables or ropes, it is usually done by measuring the diameter thereof by means of calipers at certain specified intervals. If a mine hoisting cable, for example, is measured at foot intervals, it would take a long time, and the test is not overly accurate.

The present invention consists of a measuring instrument which may be quickly and easily applied to a rope or cable and will indicate the decrease of circumference whether it be from exterior wear or interior corrosion. This may be done very easily, quickly, and accurately so that the time required for testing a long article, such as a cable or rope, is greatly reduced. The testing can be done without the inspector touching the article. This is particularly advantageous since mine hoisting and elevator cables are covered with cable dressing.

This instrument includes an open loop adapted to be placed around a cylindrical article, such as a rope or cable. Means is provided for moving one end of the loop towards the other, and a meter associated with the loop indicates the size of the article when said loop has been drawn around the latter.

Examples of this invention are illustrated in the accompanying drawings, in which, Figure 1 is a perspective view of the measuring instrument, Figure 2 is a perspective view of the instrument taken at a different angle from Figure 1, Figure 3 is an elevation of the instrument applied to a rope or cable and indicating that it is the correct size, Figure 4 is a plan view of an alternative form of instrument, Figure 5 illustrates a loop used in the instrument, Figure 6 is an enlarged sectional detail, Figure 7 is a section through a pressure meter which may be used with this instrument, Figure 8 is a fragmentary view of one end of the measuring instrument illustrating an alternative method of connecting the loop thereto, and Figure 9 is a fragmentary sectional view of the end of the instrument shown in Figure 8.

Referring to the drawings, 10 and 11 are a pair of arms pivoted in relation to each other in any suitable manner, such as by means of a pivot 12, and forming tongs. These arms may be formed with thumb and finger holes 13 and 14 at their outer ends. The portions of the arms on the opposite side of the pivot to the thumb and finger holes are preferably curved as shown so that their working or inner ends 17 and 18 extend towards each other. In this example when the outer ends of the tong arms are moved towards each other, the inner ends are brought together. These inner ends may be offset in relation to each other so that they may overlap.

An open loop 21 formed of fine wire or any other suitable material extends from one of the inner ends of the arms to the other. The loop may be attached to the arm ends in any suitable manner. In this example, the loop is formed with an eyelet 22 at each end thereof, see Figure 5, and it is removably held in place on each arm end by a clamping plate 24 secured thereto by a screw 25. The eyelet 22 of the measuring loop may fit over a pin 27 located in a cavity 28 formed in the end of the arm. When the plate 24 is held in position by the screw 25 the eyelet is retained on its pin.

A meter is provided for indicating the size of the article being measured when the loop has been drawn around the latter. In Figures 1 to 3, a meter 32 is mounted on the arm 10 adjacent its inner end. This meter has an indicating hand 33 co-operating with a graduated dial 34, and an operating spindle 35 projecting outwardly therefrom. An extension 36 may be threaded on the outer end of the spindle in order that the length of the latter may be adjusted.

A block 40 is mounted on the inner end of the arm 11 and has an anvil 41 threaded therethrough and extending towards the spindle of the meter. A lock nut 42 is threaded on the outer portion of the anvil.

The length of the measuring loop 21 is designed for cylindrical articles of a certain size. Different loops are used for articles of different sizes. When the instrument is to be used, the inner ends 17 and 18 of the tong arms are moved away from each other and the measuring loop placed around the article. Then the outer ends of the tong arms are moved together to draw the loop tightly around the article. If the inner ends of the arms are offset in relation to each other, they will overlap so that the inner ends of the measuring loop may be brought into line with each other. At this time, the hand of the meter indicates whether the article is the correct size, or too large or too small. The instrument may be set or its accuracy checked by placing the measuring loop around a cylinder, the outside diameter of which is of a certain size. When the loop is drawn tightly around the cylinder, the meter hand should be at zero. If it is not, the anvil 41 should be screwed in or out of its block until the hand is at zero. When the instrument is used to measure an article, such as a rope or cable, the hand will be at zero when the article is its correct size. If the hand is on either side of the zero mark it would indicate that the article is above or below its normal size.

The accuracy of the instrument may be increased by providing means for ensuring that the degree of pressure on the measuring loop is always the same. One way of accomplishing this is illustrated in Figures 1 to 3. In these figures, the arm 11 is formed in two sections 50 and 51 pivotally connected together by the pivot 12. A pressure meter 53 is mounted on the section 51 spaced from the pivot 12. This meter consists of a housing 54 having a spring-loaded plunger 55 projecting outwardly therefrom, see Figure 7. An indicator 57 is pivotally mounted on the outside of the housing. A lug 60 extends from the section 50 of the arm along its section 51 and beneath the pressure meter. A stop 61 prevents the lug 60 from moving too far away from the pressure meter. A finger 63 extends from the outer end of the lug 60 alongside the indicator 57. A small lug 64 projects outwardly from the indicator and fits into a notch 65 in the lug 63.

When the outer ends of the tong arms are squeezed towards each other, the lug 60 presses against the spring-loaded plunger 55 of the pressure meter. At the same time, the lug 64 causes the indicator 57 to pivot, and when said indicator reaches a mark 66 on the meter, a predetermined degree of pressure has been exerted.

As stated above, the instrument may be set by placing the measuring loop around a cylinder of a given size. When this is done, the outer ends of the tong arms are squeezed together until the indicator 57 has reached the mark 66 on the pressure meter. At this time, the anvil should be turned until the hand 33 of the meter 32 is at zero. It is preferable that the hand should have made one revolution by this time. With this arrangement, the strain on the measuring loop will always be the same regardless of who is using the instrument.

It is desirable to keep the plane of the measuring loop at right angles to the axis of the cylindrical article. To this end, members 68 and 69 may project outwardly from each of opposite sides of one of the arms, in this example arm 10. These members may be shaped to bear against the side of the article when the loop is placed around it. However, it is preferable to provide adjusting screws 70 and 71 threaded in the outer ends of these members and having lock nuts 72 and 73 thereon. These screws may be adjusted so that when they bear against the side of the article the plane of the measuring loop is substantially at right angles to the axis of the article.

This prevents the loop from being tipped out of its correct plane in one direction. A guide arm 75 may be provided on the arm 11 for preventing said loop from being tipped out of the proper plane in another direction. The guide arm is preferably pivotally mounted on the tong arm and means is provided for retaining it in a predetermined position when said arm is in its operative position, which is substantially at right angles to the tong arm. A finger 76 extends from the guide arm and is adapted to bear against the article on the same side thereof as the opening of the measuring loop. When the set screws 70 and 71 bear against the article on opposite sides of the tongs, and the finger 76 bears against said article on the side thereof remote from the pivot of the tong, the measuring loop is lying in its correct plane in relation to the article.

Figure 4 illustrates an alternative form of the invention. In this example, instead of the meter arrangement shown in Figures 1 and 3, an ordinary micrometer 80 is mounted on the inner end of the arm 11. An anvil 81 is adjustably mounted on the inner end of the arm 10 and extends towards the micrometer. With this arrangement, the size of the measuring loop 21 is set at the minimum size of the article to be measured. When the measuring loop is applied to the article by means of the tongs, it is drawn tightly around said article. When this is done, the micrometer may be operated to indicate how much larger the article is than the minimum size. Of course, if the micrometer and anvil come together the article is of the minimum size or less.

While the measuring meter has not been shown on the alternative of Figure 4, it is obvious that it could be used with it. Furthermore, the members 68 and 69 and/or the adjusting arm 75 with their associated parts may also be used with this alternative.

Figures 8 and 9 illustrate an alternative method of attaching the measuring loop 21 to the outer ends of the arms 10 and 11. A lug 86 is provided for each end of the loop. Each lug has a socket 87 at one end and extending transversally thereof into which an end of the loop is fitted and secured in any convenient manner, such as by soldering. Each lug is also provided with a cylindrical shoulder 89 projecting outwardly therefrom adjacent its opposite end. A reduced threaded portion 90 extends outwardly from the outer surface of the shoulder.

Each of arms 10 and 11 is provided with a notch 94 in one side thereof at its free end. The notch of one arm faces the notch of the other arm when the ends of the said arms overlap. Each arm has a hole 93 therethrough at its notch.

The loop 21 is attached to the arms by inserting the shoulders 89 of the lugs 86 through the holes 93. The lugs fit into the recesses 94 and are substantially flush with the surface of the arms. Nuts 96 are threaded on to the reduced portions 90 to retain the lugs in position. It is preferable to have the shoulders 89 project slightly beyond the surface of the arms, so that the nuts bear against their outer ends. This allows the lugs to pivot within the limits of the recesses 94.

With the arrangement shown in Figures 8 and 9 there are no sharp bends in the loop 21 and the ends thereof overlap each other when the ends of the arms 10 and 11 are overlapped. The loop operates in the same manner as described above.

The meter 32 and associated elements have been omitted in Figures 8 and 9, for the sake of clarity. However, it is to be understood that the meter is used in this form of the invention and functions in the same manner as described in connection with Figures 1 to 3.

This measuring instrument may be very quickly and easily used. It is only necessary to open the inner ends of the tongs to enable the measuring loop to be placed around the article. When the opposite ends of the tong arms are squeezed towards each other, it will be instantly seen whether the diameter of the article is too small at the point being measured. The speed and ease with which this instrument may be used makes it possible accurately to test a long rope or cable without taking too much time. Furthermore, the measuring loop is preferably formed of wire in order that it will cut through any grease or dirt which may be on the cable. By having the pressure meter described above, the operator of the instrument can be reasonably sure that the loop will cut through any grease or dirt and get down to the rope or cable. This means that a certain degree of pressure must be applied to the instrument before it will correctly indicate the size of the article. By having measuring loops of different sizes, the instrument may be used for articles of various sizes. A cylinder of the correct size should be supplied for each measuring loop in order that the instrument may be set properly.

What I claim as my invention is:

1. An instrument for measuring cylindrical articles, and particularly articles the ends of which are not free, such as ropes, cables or the like, comprising a pair of arms pivoted at a point spaced from their opposite ends in relation to each other and forming tongs, said tongs being formed with working ends on one side of the pivot and handles on the opposite side thereof, said working ends of the arms being adapted to be brought together, an open loop formed of fine wire extending between and fixedly secured at its opposite ends to the working ends of the tongs, said loop opening outwardly from the working ends, and a meter associated with the loop for indicating the size of the article when said loop has been drawn around the latter by the arms.

2. An instrument for measuring cylindrical articles, and particularly articles the ends of which are not free, such as ropes, cables or the like, comprising a pair of arms pivoted at a point spaced from their opposite ends in relation to each other and forming tongs, said tongs being formed with working ends on one side of the pivot and handles on the opposite side thereof, said working ends of the arms being adapted to be overlapped, an open loop formed of fine wire extending between and fixedly secured at its opposite ends to the working ends of the tongs, said loop opening outwardly from the tongs working ends and having its ends brought together when the arm ends are overlapped, and a meter associated with the loop for indicating the size of the article when said loop has been drawn around the latter by the arms.

3. An instrument for measuring cylindrical articles, such as ropes, cables or the like, comprising a pair of arms pivoted at a point spaced from their opposite ends in relation to each other and forming tongs, the ends of the arms at one end of the tongs being adapted to be brought together, an open loop extending from one of said ends to the other and fixedly secured at its opposite ends to said arm ends, a meter mounted on one of said arm ends, an operating spindle projecting from the meter, and an anvil mounted on the other of said arm ends, said anvil being adapted to engage the spindle to operate the meter to indicate the size of the article when the loop has been drawn around the latter by the arms.

4. An instrument for measuring cylindrical articles, such as ropes, cables or the like, comprising a pair of arms pivoted at a point spaced from their opposite ends in relation to each other and forming tongs, the ends of the arms at one end of the tongs being adapted to be brought together, an open loop extending from one of said ends to the other and fixedly secured at its opposite ends to said arm ends, a meter mounted on one of said arm ends, an operating spindle projecting from the meter, means for adjusting the length of the spindle, and an anvil adjustably mounted on the other of said arms, said anvil being adapted to engage the spindle to operate the meter to indicate the size of the article when the loop has been drawn around the latter by the arms.

5. An instrument for measuring cylindrical articles, such as ropes, cables or the like, comprising a pair of arms pivoted at a point spaced from their opposite ends in relation to each other and forming tongs, said tongs being formed with working ends on one side of the pivot and handles on the opposite side thereof, said working ends of the arms being adapted to be brought together, an open loop formed of fine wire extending between and fixedly secured at its opposite ends to the working ends of the tongs, said loop being positioned between the arms and opening outwardly from the ends thereof, said loop opening outwardly from the working ends, a meter associated with the loop for indicating the size of the article when said loop has been drawn around the latter by the arms, and means for indicating the degree of pressure on the loop when it is drawn around the article.

6. An instrument for measuring cylindrical articles, such as ropes, cables or the like, comprising a pair of arms pivoted at a point spaced from their opposite ends in relation to each other and forming tongs, said tongs being formed with working ends on one side of the pivot and handles on the opposite side thereof, said working ends of the arms being adapted to be brought together, an open wire loop extending from one of said ends to the other and fixedly secured at its opposite ends to said arm ends, a meter associated with the loop for indicating the size of the article when said loop has been drawn around the latter by the arms, one of the arms being formed in two sections connected by the pivot of the arm, a pressure meter on one of the arm sections, and means on the other arm section for operating the pressure meter when the loop is drawn around the article.

7. An instrument for measuring cylindrical articles, such as ropes, cables or the like, comprising a pair of arms pivoted at a point spaced from their opposite ends in relation to each other and forming tongs, said tongs being formed with working ends on one side of the pivot and handles on the opposite side thereof, said working ends of the arms being adapted to be brought together, an open loop formed of fine wire extending between and fixedly secured at its opposite ends to the working ends of the tongs, said loop opening outwardly from the working ends, a meter associated with the loop for indicating the size of the article when said loop has been drawn around the latter by the arms, one of the arms being formed in two sections connected by the pivot of the arm, a pressure meter on one of the arm sections, and means on the other arm section for operating the pressure meter when the loop is drawn around the article.

8. An instrument for measuring cylindrical articles, such as ropes, cables or the like, comprising a pair of arms pivoted at a point spaced from their opposite ends in relation to each other and forming tongs, said tongs being formed with working ends on one side of the pivot and handles on the opposite side thereof, said working ends of the arms being adapted to be brought together, an open loop formed of fine wire extending between and fixedly secured at its opposite ends to the working ends of the tongs, a meter associated with the loop for indicating the size of the article when said loop has been drawn around the latter by the arms, and a member projecting outwardly from one of the arms adapted to bear against the article to keep the loop in its correct position in relation to said article.

9. An instrument for measuring cylindrical articles, such as ropes, cables or the like, comprising a pair of arms pivoted at a point spaced from their opposite ends in relation to each other and forming tongs, said tongs being formed with working ends on one side of the pivot and handles on the opposite side thereof, said working ends of the arms being adapted to be brought together, an open loop formed of fine wire extending between and fixedly secured at its opposite ends to the working ends of the tongs, a meter associated with the loop for indicating the size of the article when said loop has been drawn around the latter by the arms, members projecting outwardly from opposite sides of one of the arms, and means at the outer ends of the members adapted to bear against the article to keep the loop in its correct position in relation to said article.

10. An instrument for measuring cylindrical articles, such as ropes, cables or the like, comprising a pair of arms pivoted at a point spaced from their opposite ends in relation to each other and forming tongs, the ends of the arms at one end of the tongs being adapted to be brought together, an open loop extending from one of said ends to the other and fixedly secured at its opposite ends to said arm ends, a meter associated with the loop for indicating the size of the article when said loop has been drawn around the latter by the arms, a guide arm projecting outwardly from one of the arms, and a finger extending from the guide arm adapted to bear against the article on the same side thereof as the opening of the loop.

11. An instrument for measuring cylindrical articles, such as ropes, cables or the like, comprising a pair of arms pivoted at a point spaced from their opposite ends in relation to each other and forming tongs, said tongs being formed with working ends on one side of the pivot and handles on the opposite side thereof, said working ends of the arms being adapted to be brought together, an open loop formed of fine wire extending from one of said working ends to the other and fixedly secured at its opposite ends to said arm ends, a micrometer mounted on one of said arm ends and extending towards the other, and an anvil adjustably mounted on the other arm end and extending towards the micrometer.

12. An instrument for measuring cylindrical articles, and particularly articles the ends of which are not free, such as ropes, cables or the like, comprising a pair of arms pivoted at a point spaced from their opposite ends in relation to each other and forming tongs, said tongs being formed with working ends on one side of the pivot and handles on the opposite side thereof, said working ends being curved from points adjacent their pivots outwardly from each other and inwardly again to form ends extending towards each other, an open loop formed of wire extending between and secured at its opposite ends to the free ends of the working ends of the tongs, said loop being positioned between the outwardly curved portions of the arms and opening outwardly from the ends thereof, and a meter associated with the loop for indicating the size of the article when said loop has been drawn around the latter by the arms.

HARVEY K. MacKENZIE.

References Cited in the file of this patent

UNITED STATES PATENTS

| Number | Name | Date |
|---|---|---|
| 783,562 | Zimmerman | Feb. 28, 1905 |
| 1,419,428 | Ulrich | June 13, 1922 |
| 1,540,378 | Wasson | June 2, 1925 |
| 1,839,434 | Whitman | Jan. 5, 1932 |
| 1,986,729 | Johnston | Jan. 1, 1935 |

FOREIGN PATENTS

| Number | Country | Date |
|---|---|---|
| 22,909 | Great Britain | Sept. 16, 1909 |
| 620,351 | Germany | Oct. 19, 1935 |
| 647,674 | Germany | July 9, 1937 |